US011535712B2

(12) United States Patent
Genty et al.

(10) Patent No.: US 11,535,712 B2
(45) Date of Patent: Dec. 27, 2022

(54) POLYTHIOETHER PREPOLYMERS AND THEIR USE IN CURABLE COMPOSITIONS IN PARTICULAR IN MASTICS

(71) Applicant: SOCOMORE, Vannes (FR)

(72) Inventors: Sébastien Genty, la Trinité-Surzur (FR); Germain Fauquet, Carnac (FR); Philippe Tingaut, Saint-Avé (FR)

(73) Assignee: SOCOMORE, Vannes (FR)

( * ) Notice: Subject to any disclaimer, the term of this patent is extended or adjusted under 35 U.S.C. 154(b) by 0 days.

(21) Appl. No.: 16/920,957

(22) Filed: Jul. 6, 2020

(65) Prior Publication Data
US 2021/0002429 A1    Jan. 7, 2021

(30) Foreign Application Priority Data
Jul. 5, 2019   (FR) ...................... 1907545

(51) Int. Cl.
C08G 75/045    (2016.01)
C08L 81/02     (2006.01)
C09K 3/10      (2006.01)
C08K 3/013     (2018.01)

(52) U.S. Cl.
CPC ............ C08G 75/045 (2013.01); C08L 81/02 (2013.01); C09K 3/1012 (2013.01); C08K 3/013 (2018.01)

(58) Field of Classification Search
CPC ..... C08G 75/045; C08L 81/02; C09K 3/1012; C08K 3/013
See application file for complete search history.

(56) References Cited

U.S. PATENT DOCUMENTS 6,172,179 B1    1/2001  Zook et al.
2013/0345372 A1*  12/2013  Blackford ............ C07D 251/34
                                                544/219

FOREIGN PATENT DOCUMENTS

| EP | 3 176 232 A1 | 6/2017 |
| EP | 3 208 291 A1 | 8/2017 |
| EP | 3 444 317 A1 | 2/2019 |
| WO | 2012/042059 A1 | 4/2012 |
| WO | 2017/044704 A1 | 3/2017 |
| WO | 2017/140489 A1 | 8/2017 |
| WO | 2018/085650 A1 | 5/2018 |
| WO | 2018/229583 A1 | 12/2018 |
| WO | 2019/010457 A1 | 1/2019 |
| WO | 2019/053646 A1 | 3/2019 |
| WO | 2019/060559 A1 | 3/2019 |
| WO | 2019/064103 A1 | 4/2019 |
| WO | 2019/099347 A1 | 5/2019 |
| WO | 2019110598 A1 | 6/2019 |

OTHER PUBLICATIONS

Preliminary Report and Written Opinion dated Mar. 26, 2020 in corresponding French application No. 1907545; 9 pages including Partial English-language translation.

* cited by examiner

Primary Examiner — Shane Fang
(74) Attorney, Agent, or Firm — Maier & Maier, PLLC

(57) ABSTRACT

A polythioether prepolymer including functional groups capable of being obtained by the reaction: of at least one compound T having a number f of thiol functional group number selected from 2, 3, 4 and 6, with at least one compound E having a number g of epoxy functional groups number selected from 2 and 3. Also, a method of preparation for this prepolymer, a composition including this prepolymer and an oligomer as well as its use as a mastic and a polythioether polymer obtained from this polythioether prepolymer with an oligomer.

15 Claims, No Drawings

POLYTHIOETHER PREPOLYMERS AND THEIR USE IN CURABLE COMPOSITIONS IN PARTICULAR IN MASTICS

FIELD OF INVENTION

This invention relates to the field of sealing coatings also called sealants, based on polythioethers, and their uses in particular in the aeronautical field.

These mastics are products formed in situ using a curable composition comprising a prepolymer and a crosslinking/hardening agent.

BACKGROUND

Mastics based on polythioethers are already known from the prior art, in particular in U.S. Pat. No. 6,172,179 B1 or more recently in patent applications WO 2018/085650 and WO 2019/010457. These polythioethers are especially prepared from prepolymers obtained by reacting a thiol with a compound comprising a double bond such as a diene. Then, at the time of application, said prepolymer is placed in the presence of a hardening agent chosen in particular from epoxy resins. These prepolymers do not contain pendant hydroxyl groups and therefore do not have the advantages associated with this property.

Furthermore, it is known to those skilled in the art that linear polymers tend to swell, that is to say they increase in bulk or in volume after prolonged exposure to hydrocarbons and other lubricants. One of the solutions proposed to overcome this drawback is to use polyfunctional agents, such as compounds having more than two reactive thiol groups, capable of producing polythioethers having a functionality greater than 2.

Consequently, there is always a need for new prepolymers having particular properties as well as compositions obtained from a prepolymer and a hardener such that at least one of the two has an average functional group number greater than or equal to 2, or such that the sum of the functional group numbers of the prepolymer and of the crosslinking agent, also called hardener, is greater than 4.

In addition, there is also always a need for new sealant compositions having specific chemical properties, adapted to the needs of aeronautics.

More particularly, the inventors of this invention have sought to develop a polythioether prepolymer having a thiol functional group number greater than 2 in order to ensure that the final polymer is in the form of a three-dimensional network.

SUMMARY

A first subject-matter of this invention relates to a polythioether prepolymer comprising thiol functional groups (—SH), and capable of being obtained by the reaction:

of at least a compound T having a number f of functional groups thiol selected from 2, 3, 4 and 6, preferably 3, 4 and 6, with at least one compound E having a number g of epoxy functional groups selected from 2 and 3.

The polythioether prepolymer therefore also comprises pendant hydroxyl (—OH) functional groups.

Advantageously during the reaction of at least one compound T and at least one compound E, the compounds T comprising thiol groups and the compounds E comprising epoxy groups react together according to a ratio number of thiol groups:number of epoxide groups from 3:1 to 4:1.

The polythioether prepolymer according to the invention has an average thiol functional group number greater than or equal to 2, preferably greater than or equal to 3, thus this prepolymer is capable of producing polymers in development, in three dimensions.

According to a first aspect, the polythioether prepolymer according to the invention has an average thiol functional group number ranging from 3 to 6 and preferably equal to 3, this preferred variant makes it possible to prepare compositions which will crosslink to give a three-dimensional network, at a speed crosslinking controllable depending on the amount of catalyst.

According to a second aspect, the polythioether prepolymer according to this invention, optionally according to the first aspect, has a molecular weight ranging from 1000 g/mol at 6000 g/mol, preferably 3000 g/mol at 6000 g/mol. The molecular weight distribution of the polythioether prepolymer is determined by steric exclusion chromatography (CES) advantageously on a column separating the high molecular weights (1000-2000000 g/mol), whose solvent is Tetrahydrofuran (THF).

According to a third aspect, the polythioether prepolymer according to this invention, optionally according to at least one of the first and second aspects, has a glass transition temperature Tg ranging from −60° C. to −30° C., preferably ranging from −40° C. to −35° C. The glass transition temperature is considered to be the start (onset) of the phase transition determined using a differential scanning calorimeter (DSC).

The analysis consists of a scan of −70° C. to +0° C. at a speed of 10° C./min under a constant flow of nitrogen in accordance with ISO standard 11357-3:2018.

According to a fourth aspect, the polythioether prepolymer according to this invention optionally according to at least one of the first, second and third aspects, has a viscosity of 100 to 500 Pa·s, preferably of 350 Pa·s The measurement is carried out on a geometry rheometer cone/plan at an oscillating speed of 0.5 $s^{-1}$, as defined in the ISO standard 11443:2014. These prepolymers are therefore liquid at room temperature (20° C.) and atmospheric pressure.

A second subject-matter of this invention relates to a method for preparing the polythioether prepolymer according to this invention comprising at least the following steps:

having at least one compound T having a number f of thiol functional groups (—SH) chosen from the group made up of functional groups 2, 3, 4 and 6;

adding to said compound T at least one compound E having a number g of epoxide functional groups chosen from the group constituted by functional groups 2 and 3, advantageously in an amount such as the ratio number of thiol groups:number of epoxide groups ranging from 3:1 at 4:1;

adding a catalyst before and/or after adding said compound E, stirring the reaction mixture comprising compound E, compound T and the catalyst, recovering the polythioether prepolymer.

A third subject-matter of this invention relates to a curable composition as well as its use as a sealant or sealant.

The sealant compositions according to the invention also have specific chemical properties, in particular properties of resistance to solvents such as hydrocarbons, water especially salt water and hydraulic fluids, more particularly it has been observed that the mechanical properties of said compositions according to the invention are kept when they are placed in the presence of these solvents: no swelling is observed. In addition, the compositions according to the invention exhibit good adhesion to their support even during the subsequent application of a solvent to said support.

In particular, the composition according to this invention when it is hardened, preferably has a hardness ranging from 20 to 100 Shore A, preferably from 40 to 70 Shore A, determined by penetration by means of a durometer according to ISO standard 868: 2003 of Mar. 1, 2003.

Other aspects, advantages, properties of this invention are presented in the description and the examples which follow.

DETAILED DESCRIPTION

Definitions

Within the meaning of the invention, "prepolymer" is meant to be understood as an oligomer or a polymer having reactive groups which allow it to participate in a subsequent polymerization and thus to incorporate several monomer units in at least one chain of the final macromolecule.

Within the sense of the invention, "polythioether" is meant to be understood as a compound comprising at least two thioether groups, that is to say "-C-S-C-" groups.

In the sense of the invention, "hardener" is meant to be understood as a compound capable of reacting with the prepolymer. The hardening compound is also called a "crosslinking agent".

Within the meaning of the invention, "curable composition" is meant to be understood as a composition comprising a prepolymer and a hardener which react spontaneously to give a cured composition comprising a crosslinked polymer.

Generally, the final polymer does not substantially comprise any more reactive functions.

Polythioether Prepolymer

The polythioether prepolymer according to this invention comprises thiol functional groups, that is to say —SH, terminals, linked to a carbon atom C, these thiol functional groups are capable of reacting with the reactive functions of the oligomer used as crosslinking agent during the use of the curable composition according to the invention. The thiol functional groups are terminal groups, that is to say that said polythioether prepolymer according to this invention does not comprise pendant thiol groups in the backbone.

The prepolymer according to this invention is not crosslinked. In fact, the prepolymer must be able to react, via its terminal thiol groups, with the reactive functions of the oligomer used as crosslinking agent to give the final hardened composition. In particular, the crosslinking rate of the polymer present in the final composition according to the invention makes it suitable for use as a sealant or mastic.

As mentioned above, the polythioether prepolymer according to this invention is capable of being obtained by the reaction:

of at least one compound T, which is a polythiol, having a number f of thiol functional groups selected from 2, 3, 4 and 6, preferably 3, 4 and 6, with at least one compound E, which is an epoxy, having a number g of epoxy functional groups selected from 2 and 3.

"functional group number of a compound" is meant to be understood as the functionality that is the number of functions, that is to say of reactive groups, present in this compound—still called a monomer —, these reactive functions being capable of participating in a chemical reaction leading to the chain growth—that is, the polymer growth—.

In this invention, the reactive functions of compound T are the thiol functions and the reactive functions of compound E are the epoxide functions.

"Epoxy" function is meant to be understood as a group comprising an oxygen bridged on a carbon-carbon bond. In this text the terms "epoxy" and "epoxides" are used interchangeably.

As already mentioned, the compounds T and E, as well as their respective amounts, are chosen so as to lead to a prepolymer of average thiol functional group number greater than or equal to 2, preferably greater than or equal to 3.

In particular, the reaction for preparing the polythioether prepolymer is performed with at least one compound T comprising thiol groups and at least one compound E comprising epoxy groups according to a ratio number of thiol groups:number of epoxide groups from 3:1 at 4:1.

"Number of thiol groups" and "number of epoxide groups" is meant to be understood as the number of groups which participate in the reaction.

Furthermore, advantageously the compounds T and E do not comprise reactive carbon-carbon double bonds, that is to say reactive alkenyl functions, nor reactive carbon-carbon triple bonds, that is to say reactive alkynyl functions.

According to a first preferred embodiment of the invention, the polythioether is obtained by the reaction of at least one compound T, having a number f of thiol functional groups selected from of 3, 4 and 6, with at least one compound E, having a number g of epoxy functional groups selected from 2 and 3.

According to a second preferred embodiment of the invention, the polythioether prepolymer is obtained by the reaction of at least one compound T, having a number of thiol functional groups equal to 2 with at least one compound E, having a number g of functional groups equal to 3.

Furthermore, said polythioether prepolymer according to the invention also includes pendant hydroxyl (—OH) functional groups. These groups are obtained following the opening of the epoxy cycles during the reaction of said epoxy cycles of the compounds E with the thiol groups of the compounds T. More particularly, the polythioether prepolymer comprises thioether groups, —S—$CH_2$—CH(OH)— with S linked to a carbon atom.

In this text the terms "hydroxy" and "hydroxyls" are used interchangeably.

Without wishing to be bound by any theory, it seems that the various groups present in the polythioether prepolymer according to the invention make it possible to obtain advantageous properties, in particular in terms of chemical resistance mainly to hydrocarbons, water especially salty water and hydraulic fluids due in particular to the presence of thioether units with pendant hydroxyl groups —S—$CH_2$—CH(OH)— and in terms of adhesion due in particular to the presence of pendant hydroxyl groups. In addition, said polythioether prepolymer can be formulated so as to have a structure having a functional group number equal to 3, particularly capable of leading to a curable composition whose crosslinking speed is controllable.

As already mentioned, the reaction mixture comprises the compounds which take part in the reaction, in particular the compound (s) E, or the compound(s) T and the catalyst.

Advantageously, the reaction mixture does not include other compounds comprising reactive functions, different from compounds E and compounds T.

Advantageously, the reaction mixture does not comprise compounds chosen from compounds comprising one or more reactive double-bonds also called alkenyl groups and compounds comprising one or more reactive triple-bonds also called alkynyl groups.

Advantageously, the reaction mixture consists of compound E, compound T and the catalyst.

Advantageously, the polythioether prepolymer according to the invention is obtained from at least one compound T comprising at least two groups chosen from the following groups:

b) —$(CH_2)_{nb}$—SH;
c) —$(CH_2)_{nc}$—O—$(CH_2)_{mc}$—SH;
d) —$(CH_2)_{nd}$—O—(CO)—$(CH_2)_{md}$—SH;
e) —$(CH_2)_{ne}$—(CO)—O—$(CH_2)_{me}$—SH;
f) —$(CH_2)_{nf}$—O—$(CH_2CH_2O)_{lf}$—$(CH_2)_{mf}$—SH;
g) —$(CH_2)_{ng}$—(CO)—O—$(CH_2CH_2O)_{lg}$—$(CH_2)_{mg}$—SH;
h) —$(CH_2)_{nh}$—O—(CO)—$(CH_2CH_2O)_{lh}$—$(CH_2)_{mh}$—SH;
i) —$(CH_2)_{ni}$—O—$(CH_2CH_2O)_{li}$—(CO)—$(CH_2)_{mi}$—SH;
j) —$(CH_2)_{nj}$—O—(CO)—$(CH_2CH_2O)_{lj}$—(CO)—$(CH_2)_{mj}$—SH; and
k) —$(CH_2)_{nk}$—(CO)—O—$(CH_2CH_2O)_{lk}$—(CO)—$(CH_2)_{mk}$—SH;

each of nb, nc, nd, ne, nf, ng, nh, ni, nj, nk being an integer ranging from 0 to 10; each of mc, md, me, mf, mg, mh, mi, mj, mk being an integer ranging from 0 to 10; and each of lf, lg, lh, li, lj, lk an integer ranging from 0 to 6.

Within the meaning of this application, an "integer ranging from 0 to 10", is meant to be understood as said integer being able to take the values 0; 1; 2; 3; 4; 5; 6; 7; 8; 9; 10 and by "integer ranging from 0 to 6", within the meaning of this application, is meant to be understood as said integer being able take the values 0; 1; 2; 3; 4; 5; 6.

According to a first variant of the invention, the polythioether prepolymer is obtained from at least one compound T of general formula (I):

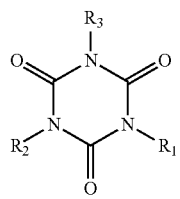

in which $R_1$, $R_2$ and $R_3$, identical or different, preferably identical, are chosen from the following groups:

a) —$C_{1-10}$ alkyl;
b) —$(CH_2)_{n1b}$—SH;
c) —$(CH_2)_{n1c}$—O—$(CH_2)_{m1c}$—SH;
d) —$(CH_2)_{n1d}$—O—(CO)—$(CH_2)_{m1d}$—SH;
e) —$(CH_2)_{n1e}$—(CO)—O—$(CH_2)_{m1e}$—SH;
f) —$(CH_2)_{n1f}$—O—$(CH_2CH_2O)_{l1f}$—$(CH_2)_{m1f}$—SH;
g) —$(CH_2)_{n1g}$—(CO)—O—$(CH_2CH_2O)_{l1g}$—$(CH_2)_{m1g}$—SH;
h) —$(CH_2)_{n1h}$—O—(CO)—$(CH_2CH_2O)_{l1h}$—$(CH_2)_{m1h}$—SH;
i) —$(CH_2)_{n1i}$—O—$(CH_2CH_2O)_{l1i}$—(CO)—$(CH_2)_{m1i}$—SH;
j) —$(CH_2)_{n1j}$—O—(CO)—$(CH_2CH_2O)_{l1j}$—(CO)—$(CH_2)_{m1j}$—SH and
k) —$(CH_2)_{n1k}$—(CO)—O—$(CH_2CH_2O)_{l1k}$—(CO)—$(CH_2)_{m1k}$—SH;

each of n1b, n1c, n1d, n1e, n1f, n1g, n1h, n1i, n1j, n1k being an integer ranging from 0 to 10; each of m1c, m1d, m1e, m1f, m1g, m1h, m1i, m1j, m1k is an integer ranging from 0 to 10; and each of l1f, l1g, l1h, l1i, l1j, l1k being an integer ranging from 0 to 6; provided that at least two radicals from the radicals $R_1$, $R_2$ and $R_3$ are chosen from groups b) to k).

Said polythioether prepolymer can be obtained from several compounds T, of general formula (I) in which $R_1$, $R_2$ and $R_3$, preferably identical, are chosen, for each of the compounds T, from groups (a) to (k) as defined above and on the condition that, for each of the compounds T, at least two radicals from the radicals $R_1$, $R_2$ and $R_3$ are chosen from groups b) to k).

Preferably said compound T of formula (I) has a number f of thiol functional groups equal to 3, that is to say that the radicals $R_1$, $R_2$ and $R_3$ are chosen from groups b) to k).

Advantageously, said polythioether prepolymer is obtained from at least one compound T of general formula (I) in which $R_1$, $R_2$ and $R_3$, which are identical, are chosen from the groups d) —$(CH_2)_{n1d}$—O—(CO)—$(CH_2)_{m1d}$—SH or e) —$(CH_2)_{n1e}$—(CO)—O—$(CH_2)_{m1e}$—SH, preferably $R_1$, $R_2$ and $R_3$ are chosen from the group d) —$(CH_2)_{n1d}$—O—(CO)—$(CH_2)_{m1d}$—SH; n1d, m1d, n1e and m1e each being an integer ranging from 0 to 10.

In particular, said compound T corresponds to the general formula (I) in which $R_1$, $R_2$ and $R_3$ are groups d): —$(CH_2)_{n1d}$—O—(CO)—$(CH_2)_{m1d}$—SH with n1d=2 or m1d=2, i.e. the tris[2-(3-mercaptopropionyloxy)ethyl]isocyanurate of formula:

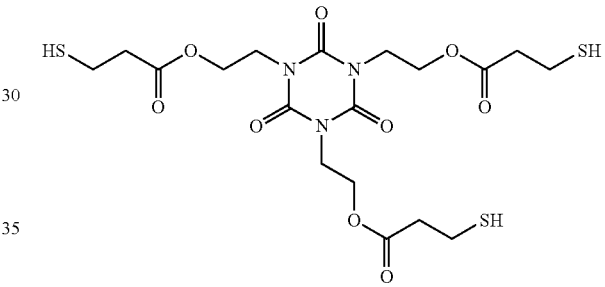

This compound is sold in particular by the company Worlée under the name THIOCURE® TEMPIC., having a molar mass M: 525 g/mol and of equivalent weight TEW thiols 180-184g/eq.

According to a second variant of the invention, the polythioether prepolymer is obtained from at least one compound T of the general formula (II):

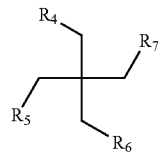

in which $R_4$, $R_5$, $R_6$ and $R_7$, identical or different, are chosen from the following groups:

a) —$C_{1-10}$ alkyl;
b) —$(CH_2)_{n2b}$—SH;
c) —$(CH_2)_{n2c}$—O—$(CH_2)_{m2c}$—SH;
d) —$(CH_2)_{n2d}$—O—(CO)—$(CH_2)_{m2d}$—SH;
e) —$(CH_2)_{n2e}$—(CO)—O—$(CH_2)_{m2e}$—SH;
f) —$(CH_2)_{n2f}$O—$(CH_2CH_2O)_{l2f}$—$(CH_2)_{m2f}$—SH;
g) —$(CH_2)_{n2g}$—(CO)—O—$(CH_2CH_2O)_{l2g}$—$(CH_2)_{m2g}$—SH;
h) —$(CH_2)_{n2h}$—O—(CO)—$(CH_2CH_2O)_{l2h}$—$(CH_2)_{m2h}$—SH;

i) —$(CH_2)_{n2i}$—O—$(CH_2CH_2O)_{l2i}$—(CO)—$(CH_2)_{m2i}$—SH;

j) —$(CH_2)_{n2j}$—O—(CO)—$(CH_2CH_2O)_{l2j}$—(CO)—$(CH_2)_{m2j}$—SH and k) —$(CH_2)_{n2k}$—(CO)—O—$(CH_2CH_2O)_{l2k}$—(CO)—$(CH_2)_{m2k}$—SH each of n2b, n2c, n2d, n2e, n2f, n2g, n2h, n2i, n2j, n2k being an integer ranging from 0 to 10; each of m2c, m2d, m2e, m2f, m2g, m2h, m2i, m2j, m2k being an integer ranging from 0 to 10; each of l2f, l2g, l2h, l2i, l2j, l2k being an integer ranging from 0 to 6; with the proviso that at least two radicals from the radicals $R_4$, $R_5$, $R_6$ and $R_7$ are chosen from groups b) to k).

Said polythioether prepolymer can be obtained from several compounds T, of the general formula (II) in which $R_4$, $R_5$, $R_6$ and $R_7$, are chosen, for each of the compounds T, from groups (a) to (k) and on the condition that, for each of the compounds T, at least two radicals from the radicals $R_4$, $R_5$, $R_6$ and $R_7$ are chosen from groups b) to k).

Preferably said compound T of formula (II) has a number f of thiol functional groups equal to 3 or 4, that is to say that three or four among the radicals $R_4$, $R_5$, $R_6$ and $R_7$ are chosen from groups b) to k).

Advantageously, according to a first variant, the polythioether prepolymer is obtained from at least one compound T of general formula (II) in which $R_4$, $R_5$ and $R_6$, which are identical, are chosen from groups: h) —$(CH_2)_{n2h}$—O—(CO)—$(CH_2CH_2O)_{l2h}$—$(CH_2)_{m2h}$—SH or i) —$(CH_2)_{n2i}$—O—$(CH_2CH_2O)_{l2i}$—(CO)—$(CH_2)_{m2i}$—SH and $R_7$ is chosen from the group a) —$C_{1-10}$ alkyl, preferably $R_4$, $R_5$, and $R_6$, which are identical, are chosen from the group i) —$(CH_2)_{n2i}$—O—$(CH_2CH_2O)_{l2i}$—(CO)—$(CH_2)_{m2i}$—SH and $R_7$ is selected from the group a) —$C_{1-10}$ alkyl.

Preferably, said compound T corresponds to the general formula (II) in which $R_4$, $R_5$ and $R_6$ are groups i) —$(CH_2)_{n2i}$—O—$(CH_2CH_2O)_{l2i}$—(CO)—$(CH_2)_{m2i}$—SH with n2i=0 and m2i=2; and $R_7$ is a methyl group, that is to say a compound of formula:

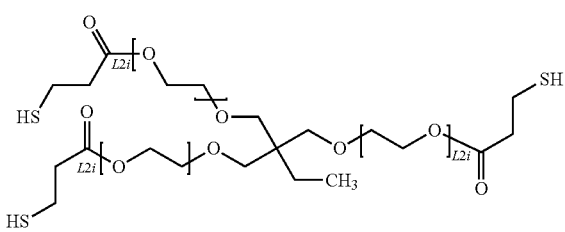

This compound in which L2i ranges from 1 to 5.7 is trimethylolpropane tri (3-mercaptopropionate) ethoxylated, in particular marketed by the company Worlée under the name Thiocure® ETTMP 1300 of molar mass M: 1274 g/mol and of equivalent weight thiols TEW:435-438 g/eq.

This compound in which L2i=0 is trimethylolpropane tri (3-mercaptopropionate), in particular marketed by the company Worlée under the name Thiocure® TMPMP of molar mass M 399 g/mol and of a weight equivalent to TEW thiols:136-140 g/eq.

According to another preferred embodiment, said compound T corresponds to the general formula (II) in which $R_4$, $R_5$, $R_6$ and $R_7$, which are identical, are chosen from the groups h) —$(CH_2)_{n2h}$—O—(CO)—$(CH_2CH_2O)_{l2h}$—$(CH_2)_{m2h}$—SH or i) —$(CH_2)_{n2i}$—O—$(CH_2CH_2O)_{l2i}$—(CO)—$(CH_2)_{m2i}$—SH, preferably in the group i) —$(CH_2)_{n2i}$—O—$(CH_2CH_2O)_{l2i}$—(CO)—$(CH_2)_{m2i}$—SH.

According to a first variant of the invention, the polythioether prepolymer is obtained from at least one compound T of general formula (III):

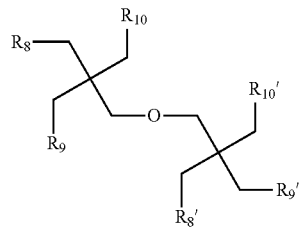

in which $R_8$, $R_9$, $R_{10}$, $R_{8'}$, $R_{9'}$ et $R_{10'}$, identical or different, preferably identical, are chosen from the following groups:

a) —$C_{1-10}$ alkyl;
b) —$(CH_2)_{n3b}$—SH;
c) —$(CH_2)_{n3c}$—O—$(CH_2)_{m3c}$—SH;
d) —$(CH_2)_{n3d}$—O—(CO)—$(CH_2)_{m3d}$—SH;
e) —$(CH_2)_{n3e}$—(CO)—O—$(CH_2)_{m3e}$—SH;
f) —$(CH_2)_{n3f}$—O—$(CH_2CH_2O)_{l3f}$—$(CH_2)_{m3f}$—SH;
g) —$(CH_2)_{n3g}$—(CO)—O—$(CH_2CH_2O)_{l3g}$—$(CH_2)_{m3g}$—SH;
h) —$(CH_2)_{n3h}$—O—(CO)—$(CH_2CH_2O)_{l3h}$—$(CH_2)_{m3h}$—SH;
i) —$(CH_2)_{n3i}$—O—$(CH_2CH_2O)_{l3i}$—(CO)—$(CH_2)_{m3i}$—SH;
j) —$(CH_2)_{n3j}$—O—(CO)—$(CH_2CH_2O)_{l3j}$—(CO)—$(CH_2)_{m3j}$—SH and
k) —$(CH_2)_{n3k}$—(CO)—O—$(CH_2CH_2O)_{l3k}$—(CO)—$(CH_2)_{m3k}$SH each of n3b, n3c, n3d, n3e, n3f, n3g, n3h, n3i, n3j, n3k being an integer ranging from 0 to 10; each of m3c, m3d, m3e, m3f, m3g, m3h, m3i, m3j, m3k being an integer ranging from 0 to 10; and each of l3f, l3g, l3h, l3i, l3j, l3k being an integer ranging from 0 to 6; provided that at least two radicals from the radicals $R_8$, $R_9$, $R_{10}$, $R_{8'}$, $R_{9'}$, et Rand $R_{10'}$, are chosen from groups b) to k).

The polythioether prepolymer may be obtained from several compounds T, of general formula (III) in which $R_8$, $R_9$, $R_{10}$, $R_{8'}$, $R_{9'}$, and $R_{10'}$, preferably identical, are chosen, for each of the compounds T, from groups (a) to (k) as defined above and on the condition that at least two radicals from the radicals $R_8$, $R_9$, $R_{10}$, $R_{8'}$, $R_{9'}$, et $R_{10'}$, are chosen from groups b) to k).

Preferably said compound T of formula (III) has a number f of thiol functional groups equal to 6, that is to say that the radicals $R_8$, $R_9$ and $R_{10}$, $R_{8'}$, $R_{9'}$, et $R_{10'}$, are chosen from groups b) to k).

Advantageously, the polythioether prepolymer is obtained from at least one compound T of general formula (III) in which $R_8$, $R_9$, $R_{10}$, $R_{8'}$, $R_{9'}$, et $R_{10'}$, which are identical, are chosen from groups h) —$(CH_2)_{n3h}$—O—(CO)—$(CH_2CH_2O)_{l3h}$—$(CH_2)_{m3h}$—SH or i) —$(CH_2)_{n3i}$—O—$(CH_2CH_2O)_{l3i}$—(CO)—$(CH_2)_{m3i}$—SH, preferably $R_8$, $R_9$, $R_{10}$, $R_{8'}$, $R_{9'}$ and $R_{10'}$, which are identical, are chosen from the group i) —$(CH_2)_{n3i}$—O—$(CH_2CH_2O)_{l3i}$—(CO)—$(CH_2)_{m3i}$—SH.

In particular, the compound of formula (III) is such that n3i=0, l3i=0 and m3i=2, that is to say dipentaerythritol hexa (3-mercaptopropionate), in particular marketed by the Worlée company under the name Thiocure® DiPETMP of a molar mass M: 783 g/mol and of equivalent TEW thiols weight: 135-140 g/eq.

According to a fourth variant of the invention, the polythioether prepolymer is obtained from at least one compound T of the general formula (IV): HS—$R_{11}$—SH with $R_{11}$ chosen from the following groups: —$(CH_2)_q$—(CO)—O—$(CH_2CH_2)$—O—(CO)—$(CH_2)_s$—; —$[(CH_2)_q$—O$]_r$—$(CH_2)_s$— and —$[(CH_2)_q$—S$]_r$—$(CH_2)_s$—, where q is an integer ranging from 2 to 6, r is an integer ranging from 1 to 5 and s is an integer ranging from 2 to 10.

When the polythioether prepolymer according to the invention is prepared from only one or more compound (s) T of formula (IV), then compound E is chosen from the compounds of formula (VI).

Preferably the compound of formula (IV) is chosen from the group formed by the di (3-mercaptopropionate) of glycol of the formula: HS—$(CH_2)_2$—(CO)—O—$(CH_2CH_2)$—O—(CO)—$(CH_2)_2$—SH; dimercaptodioxaoctane (DMDO) of the formula: HS—$[(CH_2)_2$—O$]_2$—$(CH_2)_2$—SH and the dimercaptodiethylsulfide of the formula: HS—$[(CH_2)_2$—S]—$(CH_2)_2$—SH. DMDO has a TEW thiols equivalent in weight to 91.15 g/eq.

The di(3-mercaptopropionate) glycol is marketed in particular by the Worlée company under the name Thiocure® GDMP with a molar mass M 238 g/mol and with a weight equivalent to TEW thiols:122-125 g/eq.

The polythioether prepolymer according to this invention can be obtained from several different T compounds, in particular 2, 3 or 4 T compounds, each chosen from the compounds of general formulas (I), (II), (III), and (IV). Mixtures of compounds T chosen from the compounds of general formulas (I), (II), (III), and (IV), preferably from the compounds of general formulas (I), (II) and (III), all proportions can be carried out in particular as a function of the average thiol functional group of said desired polythioether prepolymer.

Advantageously, the polythioether prepolymer is obtained from at least one compound E of formula (V):

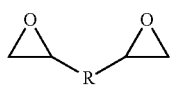

with R being a group —$C_{1-6}$ Alk-O—R'—$C_{1-6}$ Alk- and R' is a group comprising at least one radical chosen from the radicals: —$C_{1-6}$ Alk; —$C_{1-6}$ Alk-O—; —$C_{6-10}$ Aryl-; —$C_{6-10}$ Aryl-O—; the radicals —$C_{6-10}$ Aryl-; —$C_{6-10}$ Aryl-O— being unsubstituted or substituted by at least one group chosen from —$C_{1-6}$ alkyl and epoxide.

Preferably R' does not include groups capable of reacting with a thiol group with the exception of epoxy groups.

Preferably R' is chosen from the group consisting of the following groups:
-$(C_{1-6}$ Alk —O—$)_n$-;
—$C_{6-10}$ Aryl-$(C_{1-6}$ Alk-$C_{6-10}$ Aryl—O—$)_n$-;
-$C_{6-10}$ Aryl-$(C_{1-6}$ Alk—$C_{6-10}$ Aryl-$)_n$-;
-$C_{6-10}$ Aryl-$C_{1-6}$ Alk-$C_{6-10}$ Aryl-substituted epoxy-$C_{1-6}$ Alk-$C_{6-10}$ Aryl-; with n being between 0 and 5.

Within the meaning of the invention:
"Alk" is meant to be understood as an alkyl or alkylene group.

"—$C_{1-6}$ Alk-" means a linear or branched alkylene chain comprising from 1 to 6 carbon atoms; preferably a methylene (—$CH_2$—) or ethylene (—$CH_2$—$CH_2$—) group; —$C_{6-10}$ Aryl- means an arylene group, that is to say an aromatic cyclic group comprising from 6 to 10 carbon atoms, preferably a phenylene group.

Preferably the molar mass of compound E of formula (V) ranges from 300 to 700 g/mol.

According to a first variant, said compound E is the diglycidyl ether of bisphenol A, also called DGEBA, of formula

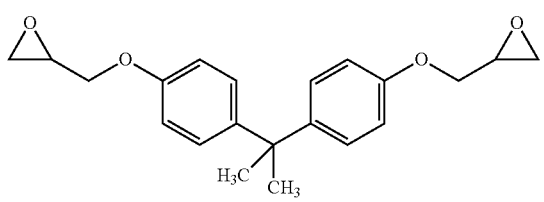 [SMILES: CC(C)(c1ccc(OCC2CO2)cc1)c1ccc(OCC2CO2)cc1]

This product is sold specifically under the name Epon®828 by the company Hexion. Its molar mass M is 340.42 g/mol and its equivalent weight of epoxides (EEW) ranging from 185 to 192g/eq.

Compound E can also be in the form of butadiene beads in diglycidyl ether of bisphenol A (DGEBA), this product is marketed under the name Kane Ace MX @154 by the Kaneka® company, with an equivalent weight of epoxides (EEW): 301 g/eq.

According to a second variant, compound E corresponds to the formula of diglycidyl ether of bisphenol F, also called DGEBF, of formula:

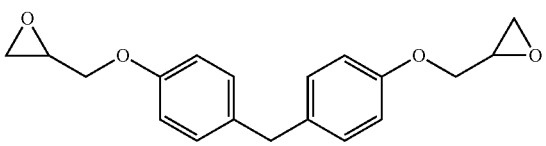 [SMILES: c1cc(OCC2CO2)ccc1Cc1ccc(OCC2CO2)cc1]

This product is sold specifically under the name DER 354 by The Dow Chemical Company. Its molar mass M is 345 g/mol and its equivalent weight of epoxides (EEW) range from 150 to 180 g/eq.

According to a third variant, the compound E corresponds to the formula (VI):

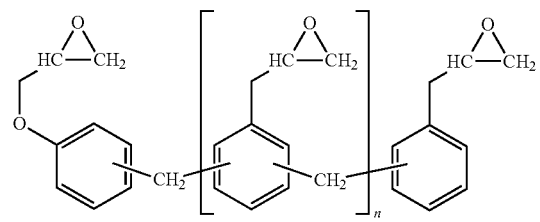

in which n ranges from 0 to 1.

These products are in particular novolak epoxy resins marketed under the name DEN 438® by the Dow company, its equivalent weight of epoxides (EEW) ranges from 176 to 181 g/eq.

According to a third variant, the compound E corresponds to the formula:

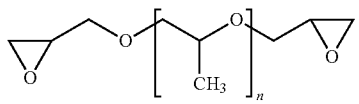

in which n ranges from 1 to 3.

These products are specifically epoxy resins marketed under the name D.E.R. 732P by the Dow company, its equivalent weight of epoxides (EEW) ranges from 310 to 330 g/eq.

As already mentioned, this invention also relates to a method to prepare the polythioether prepolymer according to this invention comprising at least the following steps:

having at least one compound T having a number f of thiol functional groups selected from 2, 3, 4 and 6;
  adding to said compound T at least one compound E having a number g of epoxide functional groups selected from 2 and 3, advantageously in an amount such as the ratio number of thiol groups:number of epoxide groups ranges from 3:1 to 4:1;
  adding a catalyst before and/or after adding said compound E,
  stirring the reaction mixture comprising compound(s) E, compound(s) T and the catalyst,
  recovering the polythioether prepolymer obtained.

Advantageously, the amount of compound(s) T ranges from 60 to 80 moles per 100 moles of reaction mixture, preferably the amount of compound(s) T ranges from 60 to 80% in moles relative to the sum of compound(s) T and compound(s) E.

Advantageously, the preparation of the prepolymer is carried out using two different T compounds.

Advantageously, the amount of compound(s) E ranges from 20 to 40 moles per 100 moles of reaction mixture, preferably the amount of compound(s) E ranges from 20 to 40% in moles relative to the sum of compound(s) T and compound(s) E.

Advantageously, the molar ratio of the compound (s) T:the compound (s) E is between 3:1 and 4:1.

When several T compounds and/or E are used, the molar ratio of the compound(s) T/the compound(s) E corresponds to the ratio of the weighted sums of the functional group numbers, that is to say the ratio:

Σ (molar percentage of each compound T×functional group number of said compound T)/Σ (molar percentage of each compound E×functional group number of said compound E).

Thus the prepolymer is prepared with a molar excess of compounds T and an excess of thiol groups relative to the epoxy groups. The prepolymer comprises thiol groups in particular present on the surface of the prepolymer, these thiol groups of the prepolymer will be capable of reacting with the reactive functions of another monomer, oligomer.

As catalysts which can be used, mention may be made of 1,8-diazabicyclo[5.4.0]undec-7-ene (DBU) or N, N-dimethylbenzylamine. Generally the amount of catalyst used ranges from 0.001 to 5% preferably from 0.1 to 2 and preferably from 0.2 to 1% by weight relative to the weight of the reaction mixture preferably relative to the sum of the catalysts' weights, of compound(s) E and compound(s) T.

Usually the reaction is carried out at room temperature, however the reaction being exothermic, the temperature increases spontaneously during the reaction up to a temperature of between 60 and 70° C. If necessary, the reaction is carried out in a container fitted with a cooling system. Generally, the reaction time is from 10 to 120 minutes, preferably from 20 to 60 minutes.

The reaction between compound(s) E and compound(s) T is generally carried out without solvents. However, a solvent can be used, it is in particular chosen from the group consisting of ethyl acetate, 3 methyl butyl acetate, 3 methyl ethyl acetate, toluene, xylene.

Curable Composition

This invention also relates to a composition comprising at least one polythioether prepolymer according to the invention or prepared according to the preparation method according to the invention, said polythioether prepolymer having a thiol functional group number selected from 2, 3, 4, 5 and 6, and at least one oligomer chosen from modified (meth) acrylate oligomers and epoxy prepolymers, the sum of the functional group number of the polythioether prepolymer and the functional group number of the oligomer being greater than 4.

This composition is curable by the formation of a cross-linked polymer, the composition can also be qualified as a polymerizable/cross-linked composition.

This invention also relates to a composition comprising at least one polythioether prepolymer according to the invention or prepared according to the preparation method according to the invention, said polythioether prepolymer having a thiol functional group number chosen from 2, 3, 4, 5 and 6, and at least one oligomer chosen from modified (meth) acrylate oligomers and epoxy prepolymers, the sum of the thiol functional group number of the polythioether prepolymer and the functional group number of the oligomer being greater than 4.

Generally, the composition is obtained from at least one polythioether prepolymer and from at least one oligomer in a polythioether prepolymer:oligomer molar ratio ranging from 0.7/1 at 1.3/1, preferably ranging from 0.9/1 at 1.1/1 and preferably an approximately stoichiometric ratio 1/1.

Oligomers

According to a first variant of the composition, the oligomer is a modified (meth) acrylate oligomer, preferably a di, tri or tetra modified (meth) acrylate oligomer, having a (meth) acrylate functional group number selected from 2, 3, 4, 5 and 6, the sum of the thiol functional group number of the polythioether prepolymer and the (meth) acrylate functional group number of the modified (meth) acrylate oligomer being greater than 4.

Modified (meth) acrylate oligomers are oligomers onto which acrylate or methacrylate terminations have generally been introduced by polyaddition. Preferably the modified (meth) acrylate oligomer is a di, tri or tetra modified (meth) acrylate oligomer.

Preferably, the modified (meth) acrylate oligomer is chosen from the group formed by modified (meth) acrylate urethanes, modified (meth) acrylate butadienes, modified (meth) acrylate aliphatic ethers, bisphenol A diglycidyl ether. modified (meth) acrylate.

By way of example of modified (meth) acrylate oligomers which can be used in the compositions according to this invention, mention may be made of urethane methacrylate sold under the name CN 1964 by the company Sartomer® (Arkema group), polybutadiene diacrylate also called PBDDA marketed under the name SR 307 by the company Sartomer®, the neopentyl glycol methacrylate marketed under the name SR 802 by the company Sartomer® and the 2 bisphenol A ethoxylated dimethacrylate also called BPA2EODMA marketed under the name SR 348 L by the company Sartomer®.

According to a second variant of the composition, the oligomer is an epoxy prepolymer, the sum of the thiol functional groups of the polythioether prepolymer and of the epoxy functional groups of the oligomer being greater than 4.

By way of example of epoxy prepolymers which can be used in the compositions according to this invention, mention may be made of the polyglycidyl ethers of bisphenol A, such as the epoxy resins Epon® 828, and the diepoxides of bisphenol F, such as Epon® 862, sold. by Hexion Specialty Chemicals, Inc. Epoxy pre-polymers containing Core Shell Rubber can also be used. Mention may also be made of the polyepoxides which are obtained by epoxidation of an olefinically unsaturated alicyclic compound, the polyepoxides which are obtained by epoxidation of an unsaturated olefinically unsaturated cyclic compound, the polyepoxides containing oxyalkylene groups and the novolak epoxy resins. Other compounds containing epoxy groups which can be used are the epoxidized bisphenol A novolaks, the epoxidized phenolic novolaks, the epoxidized cresyl novolak.

The composition according to the invention is advantageously a two-component composition, that is to say two parts, part A and part B, which are stored separately and mixed at the time of use.

Said composition is curable, that is to say that the two parts constituting this composition: the basic composition called composition part B comprising the polythioether prepolymer according to the invention and the accelerator called composition-part A comprising the oligomer are likely to react as a reaction of polymerization/crosslinking when brought together; this reaction leading to a cross-linked three-dimensional polymer.

Preferably this reaction is carried out under substantially stoichiometric conditions, that is to say with amounts of reagents such that the number of thiol functions—of the polythioether prepolymer—is equal to the number of functions capable of reacting with the thiol functions of the prepolymer chosen from the (meth) acrylate and epoxy functions.

This reaction can be carried out in the presence of a catalyst. However, this reaction is preferably carried out without adding a catalyst, other than the one already used during the preparation of the polythioether prepolymer.

Advantageously, the reaction takes place without being activating by an external source of energy. The reaction is generally carried out under mild conditions, in particular at room temperature, 20° C.

Advantageously, the composition according to the invention comprises at least one filler chosen from organic fillers and inorganic fillers, preferably the amount of filler(s) is between 0 and 50% by weight relative to the total weight of said composition. As inorganic fillers, there may be mentioned: calcium carbonate, vitreous silica, silicates especially chosen from the group formed by talc, mica, kaolin. The following polymers may be mentioned as organic fillers: polyethylene PE, polyamide (PA), polyimide (PI) and polyphenylene sulfone (PPS).

The part A composition generally comprises at least one additive chosen from the group consisting of adhesion promoters, pigments, plasticizers, surfactants, rheology modifying agents. The amount in each of the additives of the composition part A is generally between 0 and 10% by weight relative to the total weight of the composition part A.

The part B composition generally comprises at least one additive chosen from the group consisting of adhesion promoters, pigments, plasticizers, surfactants, rheology modifying agents. Part B preferably comprises an adhesion-promoting silane compound.

The amount in each of the additives of the composition part B is generally between 0 and 10% by weight relative to the total weight of composition part B.

Generally the amount of the composition part A ranges from 30% to 70%; preferably 50% by weight relative to the total weight of the curable composition. Generally the amount of the composition part B ranges from 30% to 70%; preferably 50% by weight relative to the total weight of the curable composition.

Advantageously, the composition according to this invention is used as a sealant or mastic, that is to say products capable of blocking the passage of water, water vapor, liquid or gaseous solvents, preferably comprising at least one organic or inorganic filler. After crosslinking, the composition according to the invention acquires properties of resistance to solvents, in particular to hydrocarbons.

Generally, part A and part B are mixed and the composition according to this invention thus obtained is applied to or on the area to be sealed.

The examples which follow are intended to illustrate the invention without limiting its scope.

EXAMPLES

Example 1 Compliant

The polyether prepolymer PTE1 is prepared in the following manner: compounds T are introduced into a container in the quantities mentioned in table 1, then compounds E are added in the quantities mentioned in table 1 as well as the catalyst, and they are stirred. Stirring is continued for 30 minutes. The reaction is exothermic, the temperature is controlled, which goes from 20 to 70° C. The polyether PTE1 prepolymer formed is recovered. The ratio number of thiol groups/number of epoxy groups is 3.3.

Then a mastic composition according to the invention was prepared by mixing 10g of composition Part B1 containing the polyether prepolymer PTE1 according to the invention and 50g of composition Part A1 containing a modified methacrylate oligomer. The components of the Part B1 and Part A1 compositions are listed in Table 1.

TABLE 1

| Composition of PTE 1 | | | |
|---|---|---|---|
| Component | Name | Quantity (in g) | Number of thiol or epoxy groups |
| Compound T of functional group number 3 | Thiocure ® TMPMP (TEW: 136-140 g/eq.) | 35.28 | 0.255 thiol eq. (35.28/138) |
| Compound T of functional group number 3 | Thiocure ® ETTMP 1300 (TEW: 435-438 g/eq) | 37.59 | 0.086 thiol eq. |
| Compound E of functional group number 2 | Kane Ace MX ® 154 (EEW: 301 g/eq) | 18.67 | 0.062 epoxy eq. (18.67/301) |

TABLE 1-continued

| Component | Name | Quantity (in g) | |
|---|---|---|---|
| Compound T of functional group number 2 | Epon ®828 (EEW: 185-192 g/eq.) | 7.92 | 0.042 epoxy eq. |
| catalyst | DBU | 0.54 | — |

| Component | Name | Quantity (in g) |
|---|---|---|
| Composition of Part B1 | | |
| PTE1 | | 65.14 |
| Calcium carbonate | Calofort U marketed by Specialty Minerals | 17.53 |
| Silica | O Micron NP3-P0 marketed by Sovitec | 13.93 |
| Organic fillers | Expancel marketed by Nouryon | 0.25 |
| Silica fumes | Cabot-Sil TS 720 marketed by Cabot | 3.15 |
| Composition of Part A1 | | |
| modified methacrylate oligomer | SR 348 L marketed by Sartomer ® | 92.12 |
| Pigment | Phthalocyanine marketed by Heubach | 0.09 |
| Silica fumes | Cabot-Sil TS 720 marketed by Cabot | 4.07 |
| Adhesion promoter | Dynasilane 1146 marketed by Evonik | 3.72 |

The properties of this sealant are collected in Table 2.

TABLE 2

| Property | Unit | Test method | Value |
|---|---|---|---|
| Density | g/cm3 | ISO 2781 | 1.12 |
| Shore A hardness | Shore A | ISO 868 | 60 |
| Peel stress | N/25 mm | AMS 3281 | 75 |
| Shear stress | MPa | EN 2243-1 | 1.9 |

In addition, the application time of the sealant prepared according to Example 1 is 2 hours at room temperature, which corresponds to a class B-2 sealant.

Example 2 Compliant

The polyether prepolymer PTE2 is prepared in the following manner: compounds T are introduced into a container in the quantities mentioned in table 3, then compounds E are added in the quantities mentioned in table 3 as well as the catalyst, and they are stirred. Stirring is continued for 40 minutes. The reaction is exothermic, the temperature is controlled, which ranges from 20 to 70° C. The polyether PTE2 prepolymer formed is recovered. The ratio number of thiol groups/number of epoxy groups is 4.

Then a mastic composition according to the invention was prepared by mixing 100g of composition Part B2 containing the polyether prepolymer PTE2 according to the invention and 45g of composition Part A2 containing a modified methacrylate oligomer. The components of the Part B2 and Part A2 compositions are listed in Table 3.

TABLE 3

| Composition of PTE 2 | | | |
|---|---|---|---|
| Component | Name | Quantity (in g) | Number of thiol or epoxy groups |
| Compound T of functional group number 3 | Thiocure ® TEMPIC (TEW 180-184 g/eq.) | 55.35 | 0.304 thiol eq. |
| Compound T of functional group number 3 | Thiocure ® ETTMP 1300 (TEW: 435-438 g/eq) | 18.71 | 0.043 thiol eq. |
| Compound E of functional group number 2 | Kane Ace MX ®154 (EEW: 301 g/eq) | 25.48 | 0.084 epoxy eq. |
| catalyst | DBU | 0.46 | |

| Component | Name | Quantity (in g) |
|---|---|---|
| Part B2 Composition | | |
| PTE2 | | 68.96 |
| Calcium carbonate | Calofort U | 29.54 |
| Zinc and calcium phosphate | ZCP marketed by Heubach | 1.17 |
| Adhesion promoter | Dynasilane MTMO marketed by Evonik | 0.33 |
| Composition of Part A2 | | |
| modified methacrylate oligomer | SR 348 L ® | 95.48 |
| Pigment | Phthalocyanine | 0.10 |
| Silica fumes | Cabot-Sil TS 720 | 3.92 |
| Adhesion promoter | Dynasilane MTMO | 0.50 |

The properties of this sealant are collected in Table 4.

TABLE 4

| Property | Unit | Test method | Value |
|---|---|---|---|
| Density | g/cm3 | ISO 2781 | 1.35 |
| Shore A hardness | Shore A | ISO 868 | 40 |
| Peel stress | N/25 mm | AMS 3281 | 90 |
| Shear stress | MPa | EN 2243-1 | 1.2 |

In addition, the application time of the mastic prepared according to Example 2 is 2 hours at room temperature, which corresponds to a class B-2 mastic.

Comparative Example 3

Then a mastic composition according to the invention was prepared by mixing 100g of composition Part B3 containing the polyether prepolymer PTE2 according to the invention and 13.8 g of composition Part A3 containing a diene. The components of the Part B3 and Part A3 compositions are listed in Table 5.

TABLE 5

| Component | Name | Quantity (in g) |
|---|---|---|
| Part B3 Composition ||| 
| PTE2 | | 65.14 |
| Calcium carbonate | Calofort U | 17.53 |
| Silica | O Micron NP3-P0 | 13.93 |
| Organic fillers | Expancel | 0.25 |
| Silica fumes | Cabot-Sil TS 720 | 3.15 |
| Composition of Part A3 |||
| Diene | DEG-DVE marketed by Sartomer ® | 100 |

The properties of this mastic are collected in Table 6.

TABLE 6

| Property | Unit | Test method | Value |
|---|---|---|---|
| Density | g/cm3 | ISO 2781 | 1.15 |
| Shore A hardness | Shore A | ISO 868 | <20 |

The hardness of the mastic obtained is very low. In addition, this mastic is only obtained after 3 days of cross-linking at room temperature, which is not acceptable.

Furthermore, the polymerization time could not be reduced even by increasing the level of catalyst.

Example 4 Compliant

The polyether prepolymer PTE4 is prepared in the following manner the compounds T are introduced into a container in the quantities mentioned in table 7, then compound E is added in the quantities mentioned in table 7 as well as the catalyst, and they are stirred. Stirring is continued for 40 minutes. The reaction is exothermic, the temperature is controlled, which goes from 20 to 70° C. The polyether PTE4 prepolymer formed is recovered. The ratio number of thiol groups/number of epoxy groups is 3.1.

Then a mastic composition according to the invention was prepared by mixing 100g of composition Part B4 containing the polyether prepolymer PTE4 according to the invention and 138.9 g of composition Part A4 containing two modified methacrylate oligomers. The components of the Part B4 and Part A4 compositions are listed in Table 7.

TABLE 7

| Composition of PTE 4 ||||
|---|---|---|---|
| Component | Name | Quantity (in g) | Number of thiol or epoxy groups |
| Compound T of functional group number 2 | DMDO (TEW: 91.15 g/eq.) | 11.50 | 0.126 thiol eq. 11.5/91.15 |
| Compound T of functional group number 3 | Thiocure ® TEMPIC (TEW 180-184 g/eq.) | 47.60 | 0.261 thiol eq. |
| Compound E of functional group number 2 | DER 732 P (TEW 310-330 g/eq.) | 40 | 0.125 epoxy eq. |
| Catalyst | DBU | 0.90 | — |

TABLE 7-continued

| Component | Name | Quantity (in g) |
|---|---|---|
| Composition of Part B4 |||
| PTE4 | | 85.41 |
| Adhesion promotor | Hardness 11078 | 2.56 |
| Catalyst | DBU | 0.13 |
| Calcium carbonate | Calofort U marketed by Specialty Minerals | 2.91 |
| Silica petals | Glass flakes GF 750 M | 5.23 |
| Adhesion promotor | Dynasilane MTMO | 0.86 |
| Hollow fillers | Expancel DE40 D30 marketed by Nouryon | 1.27 |
| Pigment | Titanium dioxide | 0.86 |
| Silica fumes | Cabot-Sil TS 720 | 0.77 |
| Composition of Part A4 |||
| Modified methacrylate oligomer | SR 348 L marketed by Sartomer ® | 53.84 |
| Modified methacrylate oligomer | SR 307 L marketed by Sartomer ® | 8.08 |
| Silica petals | Glass flakes GF 001 Epoxy | 16.00 |
| Calcium carbonate | Calofort U | 18.72 |
| Pigment | Phthalocyanine | 0.02 |
| Silica fumes | Cabot-Sil TS 720 | 1.72 |
| Adhesion promotor | Dynasilane 1146 | 1.62 |

The properties of this sealant are collected in Table 8.

TABLE 8

| Property | Unit | Test method | Value |
|---|---|---|---|
| Density | g/cm3 | ISO 2781 | 1.35 |
| Shore A hardness | Shore A | ISO 868 | 55 |
| Peel stress | N/25 mm | | 50 |
| Shear stress | MPa | EN 2243-1 | 1.15 |

In addition, the application time of the mastic prepared according to Example 4 is 2 hours at room temperature or 30 minutes at 150° C.

Example 5 (Compliant)

The polyether prepolymer PTE5 is prepared in the following manner: the compounds T are introduced into a container in the quantities mentioned in table 7, then compounds E are added in the quantities mentioned in table 9 as well as the catalyst, and they are stirred. Stirring is continued for 40 minutes. The reaction is exothermic, the temperature is controlled, which goes from 20 to 70° C. The polyether PTE5 prepolymer formed is recovered. The ratio number of thiol groups/number of epoxy groups is 3.0.

Then a mastic composition according to the invention was prepared by mixing 100g of composition Part B5 containing the polyether prepolymer PTE5 according to the invention and 108 g of composition Part A5 containing two epoxy prepolymers. The components of the Part B5 and Part A5 compositions are listed in Table 9.

TABLE 9

Composition of PTE 5

| Component | Name | Quantity (in g) | Number of thiol or epoxy groups |
|---|---|---|---|
| Compound T of functional group number 2 | DMDO (TEW: 91.15 g/eq.) | 53.46 | 0.586 thiol eq. |
| Compound T of functional group number 3 | Thiocure ® TEMPIC (TEW 180-184 g/eq.) | 1.99 | 0.011 thiol eq. |
| Compound E of functional group number 2 | DER 732 P (TEW 310-330 g/eq.) | 20.94 | 0.065 epoxy eq. |
| Compound E of functional group number 2 | DER 332 P (TEW 170-175 g/eq.) | 22.94 | 0.133 epoxy eq. |
| Catalyst | DBU | 0.67 | — |

| Component | Name | Quantity (in g) |
|---|---|---|
| Composition of Part B5 | | |
| PTE5 | | 82.23 |
| Solvent | Ethyl acetate | 5.02 |
| Adhesion promotor | Hardness 11078 | 2.47 |
| catalyst | DBU | 0.13 |
| Calcium carbonate | Calofort U | 2.79 |
| Silica petals | Glass flakes GF 750 M | 5.06 |
| Pigment | Titanium dioxide | 0.82 |
| Adhesion promotor | Dynasilane MTMO | 0.82 |
| Hollow fillers | Expancel DE40 D30 | 0.66 |
| Composition of Part A5 | | |
| Epoxy prepolymer | DEN 431 | 26.08 |
| Epoxy prepolymer | DEN 332 | 26.08 |
| Plasticizer | Benzoflex 9-88 | 10.95 |
| Silica petals | Glass flakes GF 001 Epoxy | 15.28 |
| Calcium carbonate | Calofort U | 18.36 |
| Pigment | Phthalocyanine | 0.02 |
| Silica fumes | Cabot-Sil TS 720 | 1.67 |
| Adhesion promotor | Dynasilane 1146 | 1.56 |

The properties of this sealant are collected in Table 10.

TABLE 10

| Property | Unit | Test method | Value |
|---|---|---|---|
| Density | g/cm3 | ISO 2781 | 1.15 |
| Shore A hardness | Shore A | ISO 868 | 45 |
| Peel stress | N/25 mm | | 120 |
| Shear stress | MPa | EN 2243-1 | 1.5 |

In addition, the application time of the mastic prepared according to Example 5 is 2 hours at room temperature or 30 minutes at 150° C.

The invention claimed is:

1. A polythioether prepolymer comprising thiol functional groups and pendent hydroxyl functional groups, wherein the polythioether prepolymer is obtained by the reaction: of at least one compound T having a number f of thiol functional groups selected from 2, 3, 4 and 6, with at least one compound E having a number g of epoxy functional groups selected from 2 and 3, and wherein during the reaction of at least one compound T and at least one compound E, the compounds T comprising thiol groups and the compounds E comprising the epoxy groups react according to a ratio number of thiol groups: number of epoxy groups from 3:1 to 4:1.

2. The polythioether prepolymer according to claim 1, wherein the polythioether prepolymer is capable of being obtained from at least one compound T comprising at least two groups selected from the group consisting of:
b) —$(CH_2)_{nb}$—SH;
c) —$(CH_2)_{nc}$—O—$(CH_2)_{mc}$—SH;
d) —$(CH_2)_{nd}$—O—(CO)—$(CH_2)_{md}$—SH;
e) —$(CH_2)_{ne}$—(CO)—O—$(CH_2)_{me}$—SH;
f) —$(CH_2)_{nf}$—O—$(CH_2CH_2O)_{lf}$—$(CH_2)_{mf}$—SH;
g) —$(CH_2)_{ng}$—(CO)—O—$(CH_2CH_2O)_{lg}$—$(CH_2)_{mg}$—SH;
h) —$(CH_2)_{nh}$—O—(CO)—$(CH_2CH_2O)_{lh}$—$(CH_2)_{mh}$—SH;
i) —$(CH_2)_{ni}$—O—$(CH_2CH_2O)_{li}$—(CO)—$(CH_2)_{mi}$—SH;
j) —$(CH_2)_{nj}$—O—(CO)—$(CH_2CH_2O)_{lj}$—(CO)—$(CH_2)_{mj}$—SH; and
k) —$(CH_2)_{nk}$—(CO)—O—$(CH_2CH_2O)_{lk}$—(CO)—$(CH_2)_{mi}$—SH;

each of nb, nc, nd, ne, nf, ng, nh, ni, nj, nk being an integer ranging from 0 to 10; each of mc, md, me, mf, mg, mh, mi, mj, mk being an integer ranging from 0 to 10; and each of lf, lg, lh, li, lj, lk being an integer ranging from 0 to 6.

3. The polythioether prepolymer according to claim 1, wherein the polythioether prepolymer is capable of being obtained from at least one compound T of general formula (I):

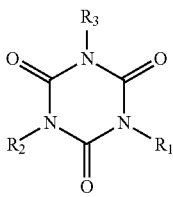

in which $R_1$, $R_2$ and $R_3$, identical or different, are selected from the group consisting of:
a) —$C_{1-10}$ alkyl;
b) —$(CH_2)_{n1b}$—SH;
c) —$(CH_2)_{n1c}$—O—$(CH_2)_{m1c}$—SH;
d) —$(CH_2)_{n1d}$—O—(CO)—$(CH_2)_{m1d}$—SH;
e) —$(CH_2)_{n1e}$—(CO)—O—$(CH_2)_{m1e}$—SH;
f) —$(CH_2)_{n1f}$—O—$(CH_2CH_2O)_{l1f}$—$(CH_2)_{m1f}$—SH;
g) —$(CH_2)_{n1g}$—(CO)—O—$(CH_2CH_2O)_{l1g}$—$(CH_2)_{m1g}$—SH;
h) —$(CH_2)_{n1h}$—O—(CO)—$(CH_2CH_2O)_{l1h}$—$(CH_2)_{m1h}$—SH;
i) —$(CH_2)_{n1i}$—O—$(CH_2CH_2O)_{l1i}$—(CO)—$(CH_2)_{m1i}$—SH;
j) —$(CH_2)_{n1j}$—O—(CO)—$(CH_2CH_2O)_{l1j}$—(CO)—$(CH_2)_{m1j}$—SH; and
k) —$(CH_2)_{n1k}$—(CO)—O—$(CH_2CH_2O)_{l1k}$—(CO)—$(CH_2)_{m1k}$—SH;

with each of n1b, n1c, n1d, n1e, n1f, n1g, n1h, n1i, n1j, n1k is an integer ranging from 0 to 10; each of m1c, m1d, m1e, m1f, m1g, m1h, m1i, m1j, m1k is an integer ranging from 0 to 10; and each of l1f, l1g, l1h, l1i, l1j, l1k an integer ranging from 0 to 6; provided that at least two radicals from the radicals $R_1$, $R_2$ and $R_3$ are chosen from groups b) to k).

4. The polythioether prepolymer according to claim 1, wherein the polythioether prepolymer can be obtained from at least one compound T of general formula (II):

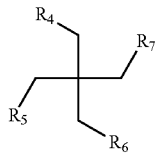

in which $R_4$, $R_5$, $R_6$ and $R_7$, identical or different, selected from the group consisting of:
a) —$C_{1-10}$ alkyl;
b) —$(CH_2)_{n2b}$—SH;
c) —$(CH_2)_{n2c}$—O—$(CH_2)_{m2c}$—SH;
d) —$(CH_2)_{n2d}$—O—(CO)—$(CH_2)_{m2d}$—SH;
e) —$(CH_2)_{n2e}$—(CO)—O—$(CH_2)_{m2e}$—SH;
f) —$(CH_2)_{n2f}$O—$(CH_2CH_2O)_{l2f}$—$(CH_2)_{m2f}$—SH;
g) —$(CH_2)_{n2g}$—(CO)—O—$(CH_2CH_2O)_{l2g}$—$(CH_2)_{m2g}$—SH;
h) —$(CH_2)_{n2h}$—O—(CO)—$(CH_2CH_2O)_{l2h}$—$(CH_2)_{m2h}$—SH;
i) —$(CH_2)_{n2i}$—O—$(CH_2CH_2O)_{l2i}$—(CO)—$(CH_2)_{m2i}$—SH;
j) —$(CH_2)_{n2j}$—O—(CO)—$(CH_2CH_2O)_{l2j}$—(CO)—$(CH_2)_{m2j}$—SH; and
k) —$(CH_2)_{n2k}$—(CO)—O—$(CH_2CH_2O)_{l2k}$—(CO)—$(CH_2)_{m2k}$—SH;

with each of n2b, n2c, n2d, n2e, n2f, n2g, n2h, n2i, n2j, n2k being an integer ranging from 0 to 10; each of m2c, m2d, m2e, m2f, m2g, m2h, m2i, m2j, m2k being an integer ranging from 0 to 10; each of l2f, l2g, l2h, l2i, l2j, l2k being an integer ranging from 0 to 6; with the proviso that at least two radicals from the radicals $R_4$, $R_5$, $R_6$ and $R_7$ are chosen from groups b) to k).

5. The polythioether prepolymer according to claim 4, wherein the polythioether is capable of being obtained from at least one compound T of general formula (II) in which $R_4$, $R_5$ and $R_6$, which are identical, are chosen from groups h)-$(CH_2)_{n2h}$—O—(CO)—$(CH_2CH_2O)$ $(CH_2)_{m2h}$—SH or i)-$(CH_2)_{n2i}$—O—$(CH_2CH_2O)_{l2i}$—(CO)—$(CH_2)_{m2i}$—SH and $R_7$ is chosen from the group a)—C1-10 alkyl.

6. The polythioether prepolymer according to claim 4, wherein the polythioether prepolymer can be obtained from at least one compound T with general formula (II) in which $R_4$, $R_5$, $R_6$ and $R_7$, which are identical, are chosen from the groups h) —$(CH_2)_{n2h}$—O—(CO)—$(CH_2CH_2O)_{l2h}$—$(CH_2)_{m2h}$—SH or i)-$(CH_2)_{n2i}$—O—$(CH_2CH_2O)_{l2i}$—(CO)—$(CH_2)_{m2i}$—SH.

7. The polythioether prepolymer according to claim 1, wherein the polythioether prepolymer is capable of being obtained from at least one compound T of general formula (III)

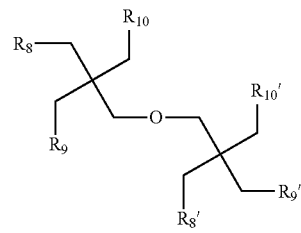

in which $R_8$, $R_9$, $R_{10}$, $R_{8'}$, $R_{9'}$ and $R_{10'}$, identical or different, are selected from the group consisting of:
a) —$C_{1-10}$ alkyl;
b) —$(CH_2)_{n3b}$—SH;
c) —$(CH_2)_{n3c}$—O—$(CH_2)_{m3c}$—SH;
d) —$(CH_2)_{n3d}$—O—(CO)—$(CH_2)_{m3d}$—SH;
e) —$(CH_2)_{n3e}$—(CO)—O—$(CH_2)_{m3e}$—SH;
f) —$(CH_2)_{n3f}$—O—$(CH_2CH_2O)_{l3f}$—$(CH_2)_{m3f}$—SH;
g) —$(CH_2)_{n3g}$—(CO)—O—$(CH_2CH_2O)_{l3g}$—$(CH_2)_{m3g}$—SH;
h) —$(CH_2)_{n3h}$—O—(CO)—$(CH_2CH_2O)_{l3h}$—$(CH_2)_{m3h}$—SH;
i) —$(CH_2)_{n3i}$—O—$(CH_2CH_2O)_{l3i}$—(CO)—$(CH_2)_{m3i}$—SH;
j) —$(CH_2)_{n3j}$—O—(CO)—$(CH_2CH_2O)_{l3j}$—(CO)—$(CH_2)_{m3j}$—SH; and
k) —$(CH_2)_{n3k}$—(CO)—O—$(CH_2CH_2O)_{l3k}$—(CO)—$CH_2)_{m3k}$SH with each of n3b, n3c, n3d, n3e, n3f, n3g, n3h, n3i, n3j, n3k being an integer ranging from 0 to 10; each of m3c, m3d, m3e, m3f, m3g, m3h, m3i, m3j, m3k being an integer ranging from 0 to 10; and each of l3f, l3g, l3h, l3i, l3j, l3k being an integer ranging from 0 to 6; provided that at least two radicals from the radicals $R_8$, $R_9$, $R_{10}$, $R_{8'}$, $R_{9'}$, and $R_{10'}$ are chosen from groups b) to k).

8. The polythioether prepolymer according to claim 1, wherein the polythioether prepolymer is capable of being obtained from at least one compound T of general formula (IV) HS—$R_{11}$—SH with $R_{11}$ chosen from the following groups:
—$(CH_2)_q$—(CO)—O—$(CH_2CH_2)$—O—(CO)—$(CH_2)_s$— or —$[(CH_2)_q$—O$]_r$—$(CH_2)_s$-and-$[(CH_2)_q$—S$]_r$—$(CH_2)_s$—, with q is an integer ranging from 2 to 6, r is an integer ranging from 1 to 5 and s is an integer ranging from 2 to 10.

9. The polythioether prepolymer according to claim 1, wherein the polythioether prepolymer can be obtained from at least one compound E of formula (V)

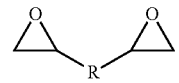

with R is a group —$C_{1-6}$ Alk-O—R'—$C_{1-6}$ Alk- and R' is a group comprising at least one radical chosen from radicals: —$C_{1-6}$ Alk; —$C_{1-6}$ Alk-O—; —$C_{6-10}$ Aryl-; and —$C_{6-10}$ Aryl-O—; radicals —$C_{6-10}$ Aryl- and —$C_{6-10}$ Aryl-O— being unsubstituted or substituted by at least one group chosen from —$C_{1-6}$ alkyl and epoxide.

10. The polythioether prepolymer according to claim 9, obtainable from a compound E corresponding to formula (VI)

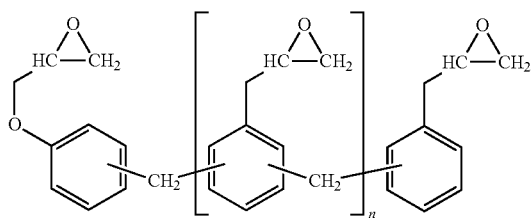

where n ranges from 0 to 1.

11. The polythioether prepolymer according to claim 1, wherein the polythioether prepolymer is capable of being obtained by the reaction: of at least one compound T selected from the group consisting of tris[2-(3-mercaptopropionyloxy)ethyl] isocyanurate, trimethylolpropane tri(3-mercaptopropionate), ethoxylated trimethylolpropane tri(3-mercaptopropionate), dipentaerythritol hexa(3-mercaptopropionate), di(3-mercaptopropionate) glycol, dimercaptodioxaoctane and dimercapto diethyl sulfur, with at least one compound E selected from bisphenol A diglycidyl ether and bisphenol F diglycidyl ether.

12. A method for preparing the polythioether prepolymer according to claim 1, comprising at least the following steps:
having at least one compound T having a number f of thiol functional groups selected from 2, 3, 4 and 6;
adding to said compound T at least one compound E having a number g of epoxide functional groups selected from 2 and 3,
adding a catalyst before and/or after adding said compound E,
stirring the reaction mixture comprising compound(s) E and compound(s) T and the catalyst, and
recovering the obtained polythioether prepolymer.

13. A composition comprising at least one polythioether prepolymer according to claim 1 or prepared according to a preparation method comprising the following steps:
having at least one compound T having a number f of thiol functional groups selected from 2, 3, 4 and 6;
adding to said compound T at least one compound E having a number g of epoxide functional groups selected from 2 and 3,
adding a catalyst before and/or after adding said compound E,
stirring the reaction mixture comprising compound(s) E and compound(s) T and the catalyst, and
recovering the obtained polythioether prepolymer, said polythioether prepolymer having a thiol functional group number selected from 2, 3, 4, 5 and 6 and an oligomer chosen from modified (meth)acrylate oligomers and oligomers containing epoxy groups, the sum of the functional group numbers of the polythioether prepolymer and of the oligomer being greater than 4.

14. The composition according to claim 13, further comprising at least one filler chosen from organic fillers and inorganic fillers.

15. The composition according to claim 13, which is a sealant or mastic.

* * * * *